INVENTORS.
RALPH L. ASHER
JOHN B. KENNEDY
BY Isidore Togut
ATTORNEY

FIG. 2A OUTPUT MOST SIGNIFICANT BIT COUNTER 6

FIG. 2B OUTPUT MAIN COMPARATOR 3

FIG. 2C OUTPUT MOST SIGNIFICANT BIT COMPARATOR 7

FIG. 2D FLIP-FLOP 10 SET INPUT

FIG. 2E FLIP-FLOP 10 RESET INPUT

FIG. 2F READING REFERENCED OUTPUT

FIG. 2G ZERO REFERENCED OUTPUT

INVENTORS.
RALPH L. ASHER
JOHN B. KENNEDY
Isidore Togut
ATTORNEY

1

3,371,334

DIGITAL TO PHASE ANALOG CONVERTER

Ralph L. Asher, New York, N.Y., and John B. Kennedy, Montville, N.J., assignors to International Telephone and Telegraph Corporation, Nutley, N.J., a corporation of Maryland Filed May 18, 1964, Ser. No. 367,992
9 Claims. (Cl. 340—347)

ABSTRACT OF THE DISCLOSURE

A digital to phase analog conversion system which provides two analog output signals such as two sine waves or two square waves, for example. The phase difference between the two analog output signals is proportional to a digital input signal which represents a digital number.

This invention relates to digital to analog converters and more particularly to digital to phase analog converters.

In digital measuring systems, it is often desirable to convert digital information binary number representations into corresponding analog representations, such as shaft rotational positions. The digital information may be stored in a counter, shift register or other digital storage devices. The error sensing apparatus, which may include a binary digital computer, is not a part of this invention; there is only required here the binary information stored in the computer or other digital apparatus which is utilized in this novel system.

An object of this invention is to provide an improved system for a digital to phase analog conversion.

Another object is to provide an improved system wherein the analog outputs of this invention can be of any frequency and are proportioned to the digital input information.

A feature of this invention is a digital to phase analog conversion system comprising digital input signals, said digital signals representing a phase relationship, means to generate clock signals at a first frequency, means to compare said clock signals with said digital signals, means to derive from said clock signals reference signals at a second frequency, and means to derive from said comparison phase information signals at said second frequency, the phase difference between said reference signal and said phase information signals being proportional to said digital input signals. The analog output can be two sine waves, two square waves, two pulses or any other two waveforms whose phase or time difference may be proportional to a digital number. The form of this phase analog of a digital number may also be the rotational position of a shaft or wheel. The position of the shaft or the wheel would then indicate the value of the digital number from which it was derived.

The above-mentioned and other features and objects of this invention will become more apparent by reference to the following description taken in conjunction with the accompanying drawings in which.

Figure 1:
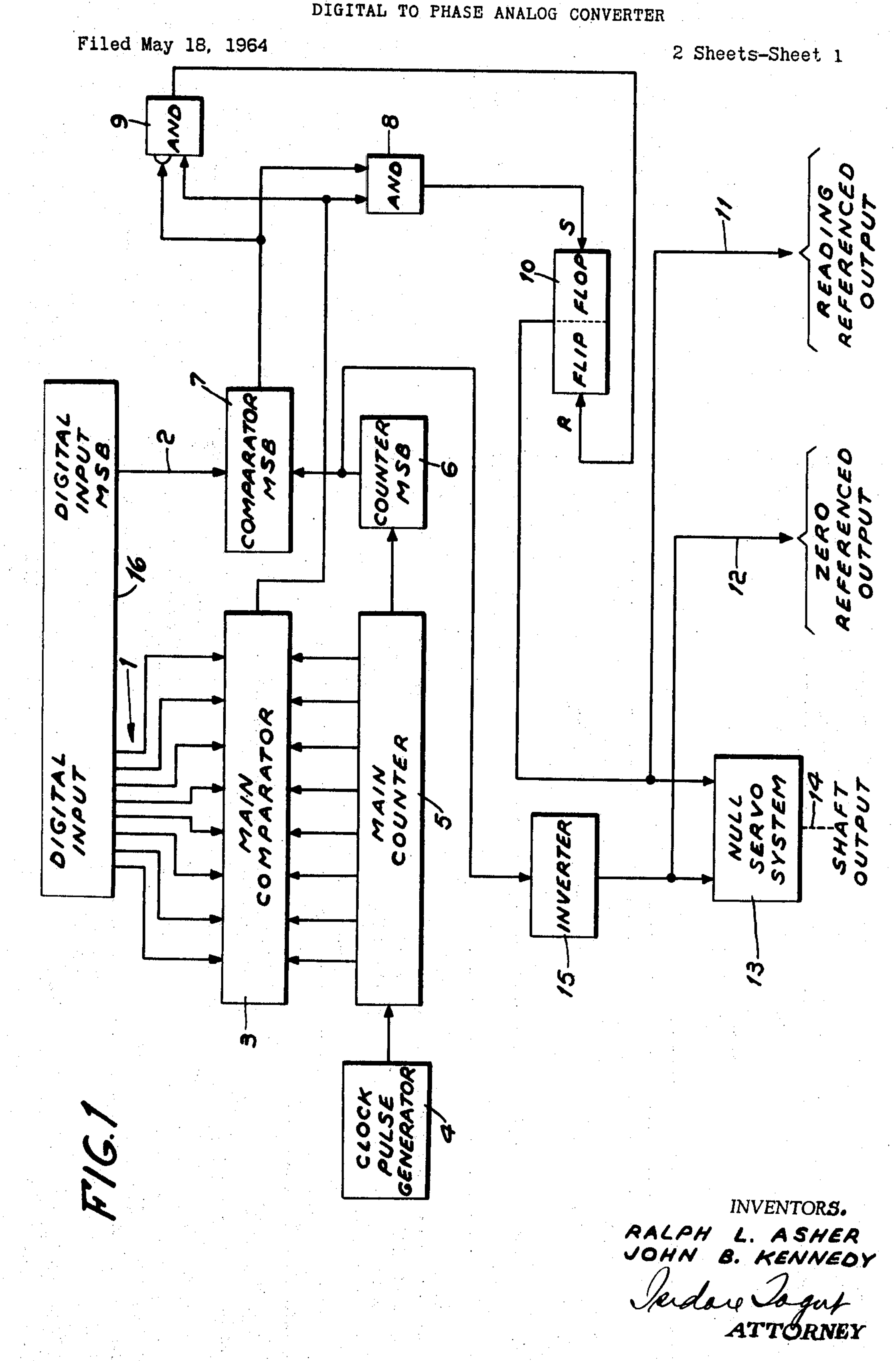
FIGURE 1 is a block diagram of our invention.

Referring now to FIGURE 1 which shows the interconnections of the circuitry for our invention, the inputs are parallel signals from each bit of the storage device 16 which contains the digital number to be converted. The storage device for this number may be a counter, shift register, or other digital storage device, generally denoted herein by block 16. The parallel input lines from each bit, except the most significant bit, are shown at 1. These bits constitute one input to a two sided main

2 parallel comparator 3. The input lines are arranged sequentially starting with the least significant and running to the bit next to the most significant. The least significant bit of input data is entered into the comparator bit which compares with the least significant bit of a counter as will be explained below.

A parallel comparator is a device made of as many bits as it is required to compare. Each bit has two inputs. When these inputs are the same, an output will result. When each bit simultaneously yields an output indicating the entire input words are equal, an output will result from the entire parallel comparator. This type of comparator is described on pp. 190 through 192 of "Computer Logic" by Flores published by Prentice Hall, 1960.

The most significant bit of the input digital number is connected to the lead marked 2. This lead constitutes one of two inputs to a one bit comparator 7. This comparator is of the type described above.

A clock pulse generator 4, provides a continuous stream of pulses to a counter. This counter is comprised of two sections; a main counter chain 5, and a most significant bit counter 6. The main counter chain has a number of binaries equal to the number of bits in the input digital word less the most significant bit. The last binary on the main counter chain 5, is coupled to the most significant bit counter 6. An output provided from each binary on the main counter chain is coupled to the main comparator 3. The leads are arranged sequentially with the first counter bit connected to the least significant bit of the comparator 3. The output of the most significant bit counter 6 is fed to the second input of the most significant bit comparator 7. The output of the main comparator 3 is coupled to AND circuits 8 and 9. The output of the most significant bit comparator 7 is coupled to the other input of AND circuit 8 and to the inhibit input of AND circuit 9.

AND circuit 8 is of the type described on pp. 397–400 of the publication "Pulse and Digital Circuits" by Millman and Taub, published by McGraw-Hill Book Company, Inc., 1956. AND circuit 9 is described on pp. 401–404 of the above-mentioned publication and has one inhibitor circuit denoted by the half circle, which AND circuit has the property that an output will appear if and only if pulses are applied to all the inputs and no pulse is applied at the inhibitor input.

The output of AND circuit 8 is connected to the set input of a bistable multivibrator, flip-flop 10. The output of AND circuit 9 is connected to the reset input of flip-flop 10. The output of flip-flop 10 constitutes the reading reference square wave and is applied to output lead 11. The output of the most significant bit counter 6 is fed to an inverter circuit 15. The output of inverter circuit 15 is a square wave whose phase is referenced to zero and this is applied to output lead 12.

The two output signals on leads 11 and 12 may also be fed to a null servo system 13. This servo system positions a shaft 14 so that its angular position with respect to a reference phase indicates the magnitude of the input digital number.

Figures 2A, 2B, 2C, 2D, 2E, 2F, 2G:
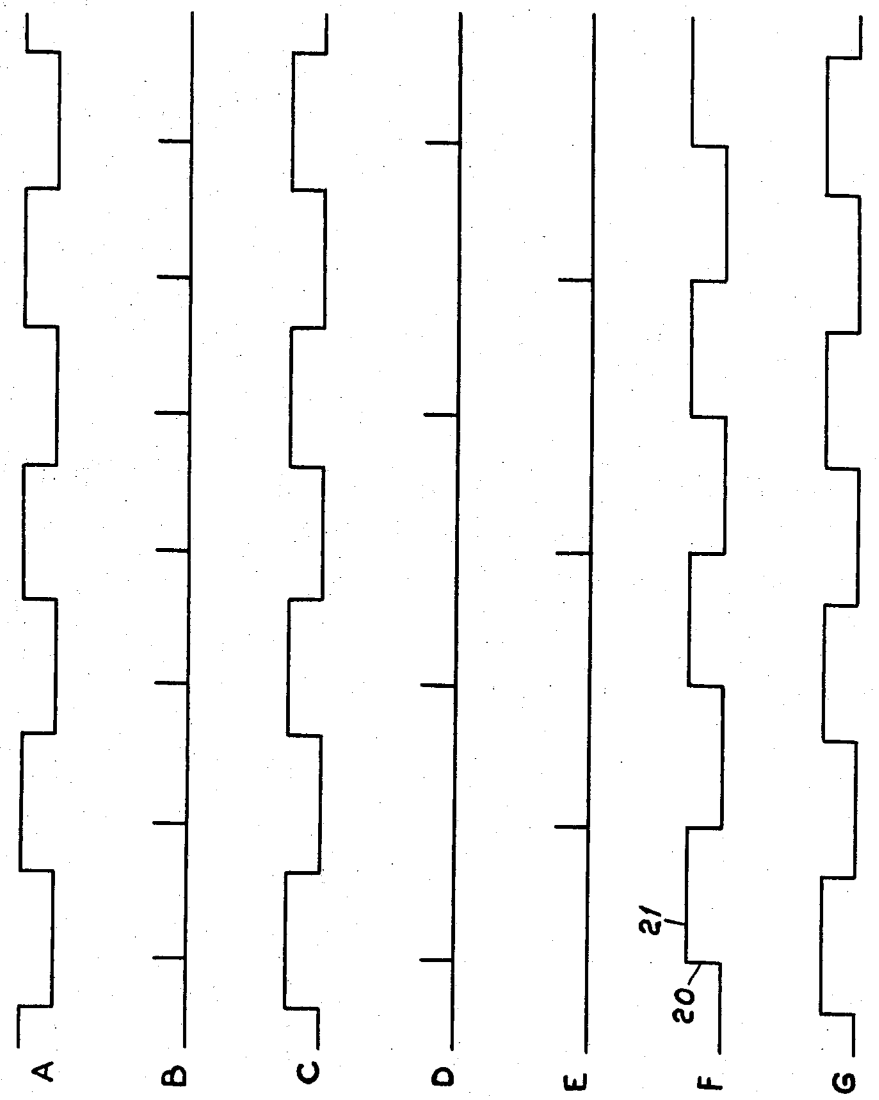
FIGURE 2 is a group of wave forms useful in explaining the operation of this invention.

The operation of the digital to phase analog converter can be explained by reference to the waveforms in FIGURE 2 in conjunction with FIGURE 1 as follows:

The digital number 1 and 2 which is to be converted to phase analog form is applied to one set of inputs of the comparator chains 3 and 7. The clock pulse generator 4 provides a continuous stream of clock pulses causing the counter chains 5 and 6 to count a maximum capacity, zero, and then count again, thus continually cycling through all possible numbers. The frequency of the counter cycle is equal to the clock pulse generator frequency divided by the maximum capacity of the counter chain. As an example there is shown here a nine bit chain and the capacity of the nine bit counter (counters 5 and 6) is $2^9$ or 512 numbers. If it is desired to have a 400 c.p.s. output as the output of this system, this frequency being chosen because synchros and similar devices are usually made to operate at this frequency, then $$f=400\times512=204.8 \text{ kc.}$$

for the clock frequency. These figures are for illustration only. It is, of course, possible to have different output frequencies and the capacity of the counter chain can be altered as desired by changing the number of bits, so that the clock pulse generator frequency is changed accordingly. It can therefore be seen that any cycling frequency may be chosen by adjusting the clock pulse repetition rate. Several cycles of the most significant bit section of the counter chain are shown in waveform A of FIGURE 2.

As the counter chain cycles, a combination of numbers is reached where all bits except the most significant are equal to the input digital number. When this occurs, the comparator 3 yields an output pulse shown in waveform B of FIGURE 2. This comparison will occur twice each counter cycle.

When output of main comparator 3 and most significant bit comparator 7 coincides there occurs an output from AND gate 8 to the set input of flip-flop 10 and thus causes the leading edge 20 of pulse 21 in waveform F. There is no output from AND gate 9 because the pulse from most significant bit comparator is inverted and inhibits AND gate 9. Flip-flop 10 remains in set position until another output of main comparator 3 occurs but there is no output from most significant bit comparator 7; this causes an output from AND gate 9 but no output from AND gate 8. The output pulse from AND gate 9 then resets flip-flop 10 thus terminating the pulse F. The full digital number occurs once in each cycle, since there are $2^n$ combinations in the main counter 5 plus the most significant bit counter 6; however, the least significant bits of the number will occur twice in each cycle of the main counter 5 only in accordance with the relation $2^{n-1}$. According to the numerical example previously given $2^n$ will provide 512 states in the main counter 5 plus the most significant bit counter 6 and $2^{n-1}$ will provide 256 states in the main counter 5 only. The most significant bit of the counter chain 6 will compare with the most significant bit of the input word once during counter cycle. The output of the most significant bit comparator 7 is shown by waveform C in FIGURE 2.

The output of the main comparator 3 and of the most significant bit comparator 7 are fed to AND circuit 8. The output of the AND circuit 8 will therefore be a pulse occurring at the time when the entire counter chain is equal to the input digital word. This output pulse is shown as waveform D in FIGURE 2.

The output of the main comparator 3 is also coupled to AND circuit 9, where the most significant bit comparator 7 output is fed to the inhibiting input. The output of this AND circuit 9 is therefore a pulse which occurs when the entire counter chain except for the most significant bit thereof is equal to the input digital word, the most significant bit being the complement of the most significant bit of the input digital word. That is, the input digital number with its most significant bit inverted. That is to say if the most significant bit is in the 1 state its complement would be 0. The output of AND circuit 9 is shown in waveform E of FIGURE 2.

The output of AND circuit 8 is applied to the set input of bistable multivibrator, flip-flop 10. When a pulse is received at this input, the flip-flop triggers to the set position. The output of AND circuit 9 is applied to the reset input of flip-flop 10. When a pulse is received at this input the flip-flop is switched to the reset condition. The resulting signal at the output of flip-flop 10 is shown by waveform F in FIGURE 2. This waveform, which is a square wave whose phase differs from the main counter cycle phase by an amount directly proportional to the input digital number, is applied to output lead 11.

The output of the most significant bit of the counter chain 6 is coupled to an inverter circuit 15. The inverter circuit reverses the polarity of this signal. The inverter output which is applied to output lead 12 is of the correct phase and polarity to indicate the zero or reference phase of the counter chain.

By applying the output waveforms to a nulling servomechanism, a shaft 14 can be positioned until its angular difference is indicative of the phase difference of the two signals applied. Thus its position from a reference is proportional to the magnitude of the input digital number. This type of servomechanism is described on pp. 46 through 48 of "Servomechanism Practice" by Ahrendt, published by McGraw Hill, 1954.

While we have described above the principles of our invention in connection with specific apparatus, it is to be clearly understood that this description is made only by way of example and not as a limitation to the scope of our invention as set forth in the objects thereof and in the accompanying claims.

We claim:

1. A digital to phase analog conversion system comprising:

a source of digital input signals, said digital input signals representing a predetermined phase relationship;

means for generating clock signals at a first frequency;

means coupled to said clock generator and to said signal source for comparing said clock signals with said digital input signals to check for identicalness of bits;

means including said comparing means coupled to said clock generator to derive from said clock signals reference signals at a second frequency; and means coupled to said comparing means to derive phase information signals at said second frequency, the phase difference between said reference signal and said phase information signals being proportional to said predetermined phase relationship represented by said digital input signals.

2. A digital to phase analog conversion system according to claim 1 wherein said digital input signals represent a number and further comprising counting means coupling said clock signals to said comparison means.

3. A digital to phase analog conversion system according to claim 2 wherein said counting means and said comparison comprises respectively a main counter and main comparator with stages corresponding to the less significant bits of said digital number and a most significant bit counter and a most significant bit comparator corresponding to the most significant bit of said number, means coupling the binaries of said main counter chain to respective stages in said main comparator, means coupling the least significant bits of said digital number to respective stages of said main comparator, means coupling the most significant bit of said digital number to said most significant bit comparator, means coupling the last binary of said main counter to said most significant bit counter and means coupling the output of said most significant bit counter to said most significant bit comparator.

4. A digital to phase analog conversion system according to claim 3 wherein the number of binaries in both said main counter and said most significant bit counter is equal to $2^n$ and the number of binaries in said main counter is equal to $2^{n-1}$.

5. A digital to phase analog conversion system according to claim 4 further comprising a first AND circuit and a second AND circuit with an inhibit input, means coupling the outputs of said comparators to both AND circuits, a bistable multivibrator, means coupling the output of said first AND circuit to the set input of said bistable multivibrator and means coupling the output of said second AND circuit to the reset input of said bistable multivibrator whereby an output from said first AND results when a comparison of the whole digital number occurs and an output from said second AND circuit occurs when a comparison of the lesser significant bits of the digital number and the complement of the most significant bit of the digital number occurs.

6. A digital to phase analog conversion system according to claim 5 wherein said pulse from said first AND circuit places said bistable multivibrator in the set condition and initiates a pulse and the pulse from said second AND circuit places said bistable multivibrator in the reset condition and terminates the pulse.

7. A digital to phase analog conversion system according to claim 6 further comprising an inverter circuit, and means coupling the output of said most significant bit counter to said inverter.

8. A digital to phase analog conversion system according to claim 6 further comprising a servo system and means coupling the outputs of said bistable multivibrator and said inverter to said servo system.

9. A digital to phase analog conversion system comprising:

a source of digital input signals, said digital input signals being a number representing phase information;

means for generating clock signals at a first frequency;

means coupled to said clock generator and to said signal source for comparing said clock signals with said digital input signals to check for identicalness of bits;

means including said comparing means coupled to said clock generator to derive from said clock signals reference signals at a second frequency;

means coupled to said comparing means to derive a first pulse from a comparison of the whole digital input number with said clock signals;

means coupled to said comparison means to derive a second pulse from the comparison of the lesser significant bits of said input digital number with said clock signals and the complement of the most significant bit of said digital input number; and means responsive to said first and second pulses to provide an information signal at said second frequency, the phase difference between said reference signal and said information signals being proportional to said digital input number.

References Cited

UNITED STATES PATENTS

| | | | |
|---|---|---|---|
| 2,888,647 | 5/1959 | Beter et al. | 340—347 |
| 3,175,138 | 3/1965 | Kilroy et al. | 340—347 |
| 3,182,306 | 5/1965 | Bartlett et al. | 340—347 |
| 3,258,667 | 6/1966 | McDonough et al. | 340—347 |

MAYNARD R. WILBUR, *Primary Examiner.*

W. J. KOPACZ, *Assistant Examiner.*